Patented Dec. 13, 1949

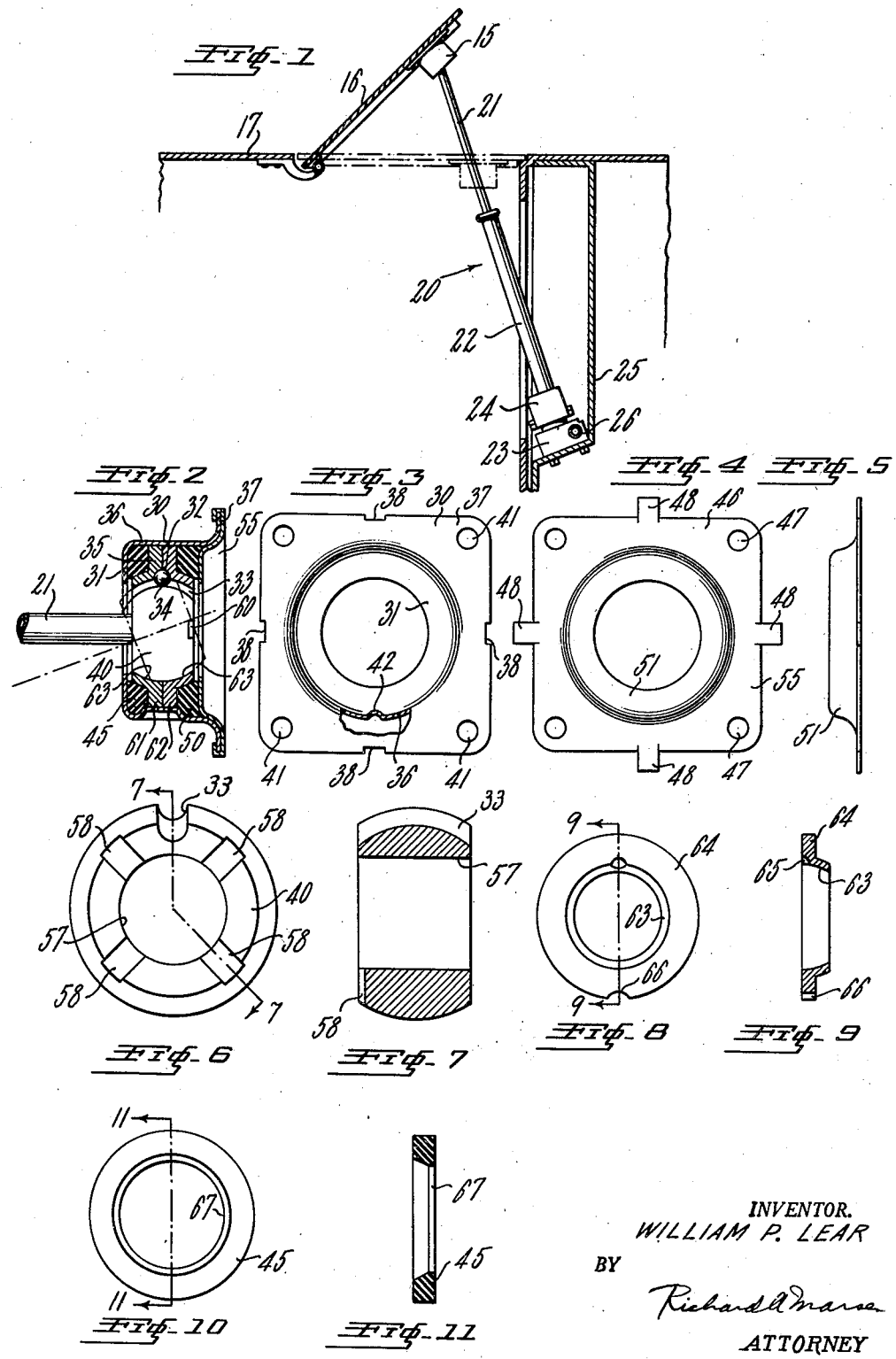

2,490,972

UNITED STATES PATENT OFFICE 2,490,972

MOUNT FOR MECHANICAL ACTUATORS

William P. Lear, North Hollywood, Calif., assignor, by mesne assignments, to Lear, Incorporated, Grand Rapids, Mich., a corporation of Illinois Application January 22, 1945, Serial No. 573,980

9 Claims. (Cl. 287—23)

1

This invention relates to actuator mounts, and more particularly to a shock absorbing mounting means incorporating a pivotal joint for connecting the ends of a linear actuator to fixed and movable surfaces.

It is among the objects of this invention to provide a novel shock absorbing actuator mount; to provide a shock absorber mount including a pivotal joint and thrust absorbing means cooperating therewith; to provide a simple, inexpensive, easily assembled pivotal shock absorber mount for actuators; and to provide a shock absorber mount including a universal joint and means for limiting the movement of elements connected to the joint to one plane.

These and other objects, advantages and features of the invention will be apparent from the following description and the accompanying drawing. In the drawing:

Fig. 1 is a longitudinal sectional view illustrating a linear actuator incorporating the mount of the present invention.

Fig. 2 is an axial sectional view through the invention mount.

Fig. 3 is an inside elevation view of a cup member forming part of the shock mount.

Fig. 4 is a front elevation view of a closure member forming part of the shock mount.

Fig. 5 is a side elevation view of the closure member shown in Fig. 4.

Fig. 6 is a front elevation view of a ball forming part of the shock mount.

Fig. 7 is a sectional view on the line 7—7 of Fig. 6.

Fig. 8 is a front elevational view of a socket element forming part of the invention.

Fig. 9 is a sectional view on the line 9—9 of Fig. 8.

Fig. 10 is a front elevation view of a shock absorbing member incorporated in the shock mount.

Fig. 11 is a sectional view on the line 11—11 of Fig. 10.

Generally speaking, the shock mount of the present invention is adapted to interconnect a pair of angularly adjustable elements, and includes a support adapted to be secured to one of the elements, a socket disposed in the support, a ball mounted in the socket and adapted to be secured to the other element, and thrust absorbing means, preferably resilient washers, disposed between the socket and the support. The mount is formed with means restricting the movement of the ball relative to the socket to a single plane, and also with means for maintaining the socket properly aligned with the support.

2

Referring to the drawing, Fig. 1 illustrates the mount 15 of the invention as incorporated in a cowl flap actuating mechanism of the type described and claimed in my Patent No. 2,319,463 issued May 18, 1943, for "Mechanical actuator system." Referring to Fig. 1, a cowl flap 16 is hingedly connected to a fixed portion 17 of the cowling of an aircraft engine and is adapted to be displaced relative thereto by a jack screw 20 of the type described and claimed in said patent. Jack screw 20 includes a pair of relatively extensible members 21 and 22. Preferably, member 21 is an internally threaded sleeve engaging a rotatable screw enclosed within member 22.

Member 21 is connected to cowl flap 16 through the medium of shock mount 15. Member 22 is suitably connected to a drive mechanism, such as a gear box 23, by a resilient mounting 24 which may be of the type described and claimed in said patent. Gear box 23 may be mounted on a support 25 secured to cowling 17, and is provided with a connection 26 whereby jack 20 may be remotely actuated through the medium of flexible shafting connected to gear box 23, all as described in said patent.

Actuator mount 15, which forms the subject matter of the present invention, is illustrated more fully in Figs. 2 through 11. The mount comprises a support 30 in which is a socket member 35. A ball 40 is disposed in socket member 35 and thrust absorbing washers 45 and 50 are disposed on each side of socket 35 engaging, respectively, an inturned flange 31 on support 30 and a closure member 55 secured to support 30.

Support 30 and closure 55 are adapted to be secured to one of the movable members, such as cowl flap 16, and ball 40 is adapted to be secured to the other adjustable member such as element 21 of screw jack 20. Means are provided for limiting movement of the ball and socket joint comprising socket 35 and ball 40, and this means may comprise a depression 32 formed in socket 35 and a groove 33 in ball 40. A ball bearing 34 is disposed in engagement with recess or depression 32 and groove 33 for restraining movement of ball 40 relative to socket 35 to substantially a single plane.

Support member 30 is generally cup-shaped, comprising a cylindrical section 36, inturned flange 31 and outturned flange 37. Outturned flange 37 is formed with a plurality of notches 38 for a purpose to be described. Member 30 is also formed with apertures 41, whereby support 30 may be secured to a suitable surface such as to cowl flap 16. Cylindrical portion 36 of support 30 is formed with a longitudinally extending inturned ridge 42 which cooperates with socket member 35, in a manner described more fully hereinafter, to maintain the socket member in alignment with the support.

Closure member 55, shown more clearly in Figs. 4 and 5, comprises a relatively flat surface 46 provided with apertures 47 adapted to be aligned with apertures 41 of support 30, and with tabs 48 adapted to be bent over into engagement with notches 38 of support 30. Closure 55 is provided centrally with a circular depression 51. The purpose of the described construction will be set forth hereinafter.

Ball 40 (Figs. 6 and 7) comprises a spherical section having circumferential groove 33 formed therein and provided with a central recess 57. One plane face of ball 40 is formed with a plurality of radially extending grooves 58 adapted to receive stakes 60 bent over from the end of member 21 of jack 20 when this member is inserted in central recess 57 of ball 40. It will be noted that the distance between the flat end faces of the ball or spherical section 40 is less than the interior corresponding dimension between flange 31 and closure 55.

Socket 35 comprises a pair of complementary members 61 and 62, each having a spherical inner surface 63 adapted to engage ball 40, and radially outturned flanges 64. Each of members 61 and 62 is also provided with a recess 65 which cooperate, when the members are juxtaposed, to form the recess or depression 32 in socket member 35. The peripheral flanges 64 of members 61 and 62 are notched as at 66 for engagement with ridge 42 of support 30 to maintain socket 35 in alignment with the support. The shock absorbing elements of the invention are illustrated more clearly in Figs. 10 and 11 as comprising annular washers having a trapezoidal cross-section and a central recess 67.

The shock absorbing mount is assembled in the following manner. Washer 45 is placed against inturned flange 31 of support 30. Socket member 61 is then placed against washer 45, and ball member 40 is disposed in bearing engagement with the socket member. The notch 66 in socket member 61 engages ridge 42 and support 30 to align the socket member with the support. Similarly, ball 40 is so disposed in relation to socket member 61 that groove 33 is aligned with notch 65. Ball bearing 34 is then placed in groove 33 and engaged with notch 65. The other socket member 62 is then placed over ball 40 with its notch 65 engaging the ball and the notch 66 in its peripheral flange engaging ridge 42 on support 30. The other resilient washer 50 is then placed in engagement with the peripheral flange of socket member 62.

Closure 55 is placed engaged with the outturned flange 37 of support 30, with circular depression 51 engaging washer 50 to compress the same and also to compress washer 45 to form a shock absorbing construction between the peripheral flanges 64 of members 61 and 62, inturned flange 31 of support 30, and depression 51 of closure 55. Tabs 48 on closure 55 are then bent over through notches 38 of support 30 to secure the shock mount in assembled condiiton. The assembled shock mount may be connected to one of the adjustable surfaces, such as cowl flap 16 by fastening means disposed through the aligned apertures 41 and 47 of support 30 and closure 55.

The described arrangement comprises a very effective mount for suitably maintaining angularly adjustable elements in their adjusted position. Due to the provision of the universal joint including ball bearing 32, the range of adjustment is greatly increased and the frictional resistance to movement of the adjustable members with respect to each other is greatly reduced. By the provision of recess 32 and groove 33 cooperating with ball 34, the movement of the universal joint may be confined to substantially a single plane. Similarly, the cooperation of notch 66 of members 61 and 62 with groove 42 of member 30, maintains socket 35 properly aligned with respect to support 30. By reason of the clearance between the flat end faces of ball 40 and the flange 31 and closure 55 forces applied endwise along actuator 20 are absorbed in one direction by dislodgment of socket part 61 against resilient washer 45 and in the other direction by dislodgment of socket part 62 against resilient washer 50. That is to say, socket parts 61 and 62 are floated substantially in an axial sense with respect to the principal axis of the actuator 20 and with obvious advantages. For example, assuming flap 16 to be a cowl flap of an airplane engine, the same will, in flight, be subjected to considerable vibration. By employing the mounting of the invention such vibrational stresses, being axially of the actuator, are efficiently absorbed.

While a specific embodiment of the invention has been shown and described in detail to illustrate the application of the principles of the invention, it will be understood by those skilled in the art that the invention may be otherwise embodied without departing from such principles.

What is claimed is:

1. A mount for connecting two angularly adjustable elements comprising, in combination, a cup-shaped support adapted to be secured to one of the elements; a peripherally flanged socket disposed in said support; a ball mounted in said socket and adapted to be secured to the other element; resilient washers engaging both sides of the socket flange; and a closure retaining said socket and washers in said cup-shaped support.

2. A mount for connecting two angularly adjustable elements comprising, in combination, a cup-shaped support adapted to be secured to one of the elements and formed with an inwardly extending longitudinal ridge; a peripherally flanged socket disposed in said support, the flange of said socket having a notch engaging said ridge; a ball mounted in said socket and adapted to be secured to the other element; and thrust absorbing means disposed between said socket and said support.

3. A shock absorbing mount for connecting two angularly adjustable elements comprising, in combination, a cup-shaped support formed with an outturned flange, adapted to be secured to one of the elements; a resilient washer disposed adjacent the base of said support; a socket having a peripheral flange engaging said washer; a second resilient washer engaging the opposite side of said peripheral flange; a ball member mounted in said socket and adapted to be secured to the other element; and a closure secured to said outturned flange and engaging said second resilient washer.

4. A shock absorbing mount for connecting two angularly adjustable elements comprising, in combination, a cup-shaped support, formed with an outturned flange, adapted to be secured to one of the elements; a resilient washer disposed adjacent the base of said support; a socket comprising a pair of peripherally flanged complementary members, the flange of one of said members engaging said washer; a second resilient washer engaging the peripheral flange of the other socket member; a ball member mounted in said socket and adapted to be secured to the other element; and a closure secured to said outturned flange and engaging said second resilient washer.

5. A shock absorbing mount for connecting two angularly adjustable elements comprising, in combination, a cup-shaped support, formed with an outturned flange, adapted to be secured to one of the elements and formed with an inwardly extending longitudinal ridge; a resilient washer disposed adjacent the base of said support; a socket comprising a pair of peripherally flanged complementary members, the flange of one of said members engaging said washer; the peripheral flanges of said members each having a notch therein, said notches being aligned and engaging said ridge; a second resilient washer engaging the peripheral flange of the other socket member; a ball member mounted in said socket and adapted to be secured to the other element; and a closure secured to said outturned flange and engaging said second resilient washer.

6. A shock absorbing mount for connecting two angularly adjustable elements comprising, in combination, a cup-shaped support formed with outturned notched flanges, adapted to be secured to one of the elements and formed with an inwardly extending longitudinal ridge; a resilient washer disposed adjacent the base of said support; a socket comprising a pair of peripherally flanged complementary members, the flange of one of said members engaging said washer, the inner faces of said members being complementarily notched to form a recess and the peripheral flanges of said members each having a notch therein, said notches being aligned and engaging said ridge; a second resilient washer engaging the peripheral flange of the other socket member; a ball mounted in said socket and adapted to be secured to the other element, and formed with a groove; a closure having ears engaged in the notches of said first mentioned flanges for securing said flanges and closure together, and said closure engaging said second resilient washer; and a ball bearing disposed in said recess and groove and restricting the movement of said ball relative to said socket to a single plane.

7. A mount for connecting two angularly adjustable elements and through which stresses are transmitted comprising in combination a hollow support adapted to be secured to one of the elements, a device including a pair of independently movable parts defining a spherical socket, each said part having an exterior peripheral rib slidably engaging the interior of the wall of said support, a spherical member mounted in said socket and secured to the other element, and shock absorbing means disposed between said parts and said support whereby to permit limited movement of the spherical member in response to forces transmitted through said elements.

8. A shock mount for connecting two angularly adjustable elements, one of said elements being elongated and arranged to transmit axial thrust imparted thereto to the other element, and a flexible connection intermediate said elements including a spherical head carried by the one element and a socket carried by the other element, said socket comprising a pair of segmentally spherical shells embracing said head, and a hollow support for said shells, a pair of independent masses of resilient material each disposed intermediate a said shell and the support whereby thrust in either axial direction may be absorbed by a shell and its associated mass of resilient material independently of the other shell and of the mass adjacent said other shell.

9. A shock mount for connecting two angularly adjustable elements, one of said elements being elongated and arranged to transmit axial thrust imparted thereto to the other element, and a flexible connection intermediate said elements including a spherical head carried by the one element and a socket carried by the other element, said socket comprising a pair of segmentally spherical shells embracing said head, each said shell having a peripheral radially extending flange at the major diameter thereof, the said shells being positioned with the opposed faces of the flanges in juxtaposition, a hollow support for said shells, and a pair of masses of resilient material each disposed intermediate a said flange and the support, whereby thrust in either axial direction may be absorbed by a shell and its associated mass of resilient material independently of the other shell and of the mass adjacent said other shell.

WILLIAM P. LEAR.

REFERENCES CITED

The following references are of record in the file of this patent:

UNITED STATES PATENTS

| Number | Name | Date |
|---|---|---|
| 255,103 | Deschamps | Mar. 21, 1882 |
| 1,463,306 | Bushnell | July 31, 1923 |
| 1,983,947 | Rockwell | Dec. 11, 1934 |
| 2,096,557 | Peo | Oct. 19, 1937 |
| 2,325,845 | Flumerfelt | Aug. 3, 1943 |
| 2,342,577 | Gehman | Feb. 22, 1944 |

FOREIGN PATENTS

| Number | Country | Date |
|---|---|---|
| 728,933 | France | Apr. 19, 1932 |